(12) United States Patent
Chandramouli et al.

(10) Patent No.: US 10,667,092 B2
(45) Date of Patent: May 26, 2020

(54) MULTIMEDIA BROADCAST/MULTIMEDIA SERVICE (MBMS) SESSION UPDATE

(71) Applicant: NOKIA SOLUTIONS AND NETWORKS OY, Espoo (FI)

(72) Inventors: Devaki Chandramouli, Plano, TX (US); Curt Wong, Sammamish, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 161 days.

(21) Appl. No.: 14/255,463

(22) Filed: Apr. 17, 2014

(65) Prior Publication Data

US 2014/0313974 A1    Oct. 23, 2014

Related U.S. Application Data

(60) Provisional application No. 61/813,791, filed on Apr. 19, 2013.

(51) Int. Cl.
| | |
|---|---|
| *H04W 4/00* | (2018.01) |
| *H04W 4/06* | (2009.01) |
| *H04W 76/22* | (2018.01) |
| *H04W 76/32* | (2018.01) |
| *H04W 76/12* | (2018.01) |
| *H04W 76/40* | (2018.01) |

(52) U.S. Cl.
CPC ............ *H04W 4/06* (2013.01); *H04W 76/22* (2018.02); *H04W 76/12* (2018.02); *H04W 76/32* (2018.02); *H04W 76/40* (2018.02)

(58) Field of Classification Search
CPC ....................................................... H04W 4/06
See application file for complete search history.

(56) References Cited

U.S. PATENT DOCUMENTS

| | | | | |
|---|---|---|---|---|
| 9,055,469 | B2* | 6/2015 | Xu ........................ | H04L 12/189 |
| 9,319,851 | B2* | 4/2016 | Yu ........................ | H04W 72/121 |
| 9,398,425 | B2* | 7/2016 | Anchan .................. | H04W 4/06 |
| 2011/0149831 | A1* | 6/2011 | Hyun ...................... | H04W 4/06 |
| | | | | 370/312 |
| 2012/0155282 | A1 | 6/2012 | Dorenbosch | |

(Continued)

FOREIGN PATENT DOCUMENTS

| | | |
|---|---|---|
| EP | 2 536 094 A1 | 12/2012 |
| WO | 2013/071147 A2 | 5/2013 |

OTHER PUBLICATIONS

European Telecommunications Standards Institute (ETSI); ETSI TS 123 246 V11.1.0 (Mar. 2012); Universal Mobile Telecommunications System (UMTS); LTE; Multimedia Broadcast/Multicast Service (MBMS); Architecture and functional description (3GPP TS 23.246 version 11.1.0 Release 11); Mar. 9, 2012.*

(Continued)

*Primary Examiner* — Guang W Li (74) *Attorney, Agent, or Firm* — Squire Patton Boggs (US) LLP (57) ABSTRACT

Systems, methods, apparatuses, and computer program products for multimedia broadcast/multimedia service (MBMS) session update are provided. One method includes receiving a session update request which may include a TGMI pointing to the current active MBMS session and new QoS requirement. The method may then include updating the MBMS bearer context with the new QoS.

23 Claims, 5 Drawing Sheets

(56) References Cited

U.S. PATENT DOCUMENTS

| | | | | |
|---|---|---|---|---|
| 2012/0163204 | A1* | 6/2012 | Oprescu-Surcobe | H04W 72/005 370/252 |
| 2012/0307707 | A1* | 12/2012 | Wang | H04W 72/005 370/312 |
| 2013/0114497 | A1* | 5/2013 | Zhang | H04W 72/005 370/312 |
| 2013/0294326 | A1* | 11/2013 | Jiao | H04W 72/005 370/312 |
| 2013/0315125 | A1* | 11/2013 | Ravishankar | H04L 12/189 370/312 |
| 2014/0071878 | A1* | 3/2014 | Xu | H04L 12/189 370/312 |
| 2014/0098745 | A1* | 4/2014 | Balasubramanian | H04W 72/005 370/328 |
| 2015/0365963 | A1* | 12/2015 | Won | H04W 28/0268 370/329 |

OTHER PUBLICATIONS

Nokia Siemens Networks; "Key issue on adding/removing media", 3GPP Draft; S2-131779 GCSE Key Issue 2 vol. SA WG2, No. Busan, South Korea; May 27, 2013-May 31, 2013 May 21, 2013 (May 21, 2013), XP050708959, Retrieved from the Internet: URL:http://www.3gpp.org/ftp/tsg sa/WG2 Arch/TSGS2 97 Busan/Docs/ [retrieved on May 21, 2013] the whole document 3GPP.

General Dynamics Broadband UK: "Media stream handling procedures for Solution 4", 3GPP Draft; S2-133673 WAS3372 GCSE Media 1-14 Streams, vol. SA WG2, No. Xiamen, P.R. China; Sep. 23, 2013-Sep. 27, 2013 Sep. 26, 2013 (Sep. 26, 2013), XP050726982, Retrieved from the Internet: URL:http://www.3gpp.org/ftp/tsg sa/WG2 Arc h/TSGS2 99 Xiamen/Docs/ [retrieved on Sep. 26, 2013] the whole document 3GPP.

Catt: "Considerations on Group Communication", 3GPP Draft; R2-133241 Considerations on Group Communication, vol. RAN WG2, No. Ljubljana, Slovenia; Oct. 7, 2013-Oct. 22, 2013 Sep. 28, 2013 (Sep. 28, 2013), XP050719127, Retrieved from the Internet: URL:http://www.3gpp.org/ftp/tsg ran/WG2 RL 2/TSGR2 83bis/Docs/ [retrieved on Sep. 28, 2013] paragraph [02.2]-paragraph [02.3].

International Search Report application No. PCT/EP2014/057884 dated Nov. 3, 2014.

S2-132972 (revision of S2-132692); Nokia Siemens Networks; "Additional media component handling with Solutions 3"; SA WG2 Meeting S2#98; Jul. 15-19, 2013, Valencia, Spain.

S2-133672 (revision of S2-133435); NSN; "Additional media notification with Multicast Delivery"; SA WG2 Meeting #99; Sep. 23-27, 2013, Xiamen, P.R. China.

International Search Report application No. PCT/EP2014/057884 dated Feb. 4, 2015.

Communication pursuant to Article 94(3) EPC issued in corresponding to European Patent Application No. 14719698.4, dated Nov. 18, 2019.

* cited by examiner

MULTIMEDIA BROADCAST/MULTIMEDIA SERVICE (MBMS) SESSION UPDATE

CROSS REFERENCE TO RELATED APPLICATIONS

This application claims priority to U.S. Provisional Application No. 61/813,791, filed on Apr. 19, 2013. The entire contents of this earlier filed application are hereby incorporated by reference in its entirety.

BACKGROUND

Field

Embodiments of the invention generally relate to wireless communications networks, such as the Universal Mobile Telecommunications System (UMTS) Terrestrial Radio Access Network (UTRAN) Long Term Evolution (LTE) and Evolved UTRAN (E-UTRAN).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment is directed to a method that includes receiving, by a network node, a session update request comprising a temporary mobile group identity (TMGI) pointing to a currently active multimedia broadcast/multimedia service (MBMS) session and a new quality of service (QoS) requirement. The method may also include updating the multimedia broadcast/multimedia service (MBMS) bearer context with the new quality of service (QoS) requirement.

In an embodiment, the updating of the multimedia broadcast/multimedia service (MBMS) bearer context may include stopping the active multimedia broadcast/multimedia service (MBMS) session and starting a new session with the new quality of service (QoS).

According to one embodiment, the updating of the multimedia broadcast/multimedia service (MBMS) bearer context may further include notifying at least one user equipment of the updating.

In an embodiment, the updating of the multimedia broadcast/multimedia service (MBMS) bearer context may further include allocating radio resources for the new quality of service (QoS) and updating the currently active multimedia broadcast/multimedia service (MBMS) session.

According to one example, the network node may be a group communication server. In another example, the network node may be a multi-cell/multicast coordination entity (MCE).

Another embodiment is directed to an apparatus including at least one processor and at least one memory including computer program code. The at least one memory and the computer program code are configured, with the at least one processor, to cause the apparatus at least to receive a session update request comprising a temporary mobile group identity (TMGI) pointing to a currently active multimedia broadcast/multimedia service (MBMS) session and a new quality of service (QoS) requirement, and to update the multimedia broadcast/multimedia service (MBMS) bearer context with the new quality of service (QoS) requirement.

Another embodiment is directed to an apparatus that includes means for receiving a session update request comprising a temporary mobile group identity (TMGI) pointing to a currently active multimedia broadcast/multimedia service (MBMS) session and a new quality of service (QoS) requirement. The apparatus may also include means for updating the multimedia broadcast/multimedia service (MBMS) bearer context with the new quality of service (QoS) requirement.

In an embodiment, the apparatus may further include means for stopping the active multimedia broadcast/multimedia service (MBMS) session, and means for starting a new session with the new quality of service (QoS).

According to an embodiment, the apparatus may further include means for notifying at least one user equipment of the update of the multimedia broadcast/multimedia service (MBMS) bearer context.

In an embodiment, the apparatus may also include means for allocating radio resources for the new quality of service (QoS), and means for updating the currently active multimedia broadcast/multimedia service (MBMS) session.

According to one example, the apparatus may be a group communication server. In another example, the apparatus may be a multi-cell/multicast coordination entity (MCE).

Another embodiment is directed to a method that includes receiving, by a network node, a secondary session request comprising multimedia broadcast/multimedia service (MBMS) session attributes. The method may also include updating the multimedia broadcast/multimedia service (MBMS) bearer context, and joining the internet protocol (IP) multicast and source address for the secondary multimedia broadcast/multimedia service (MBMS) session.

In an embodiment, the method may also include notifying one or more user equipment (UE(s)) of the secondary multimedia broadcast/multimedia service (MBMS) session.

According to an embodiment, the method may further include broadcasting secondary media via the secondary multimedia broadcast/multimedia service (MBMS) session.

In an embodiment, the multimedia broadcast/multimedia service (MBMS) session attributes may include at least one of a temporary mobile group identity (TMGI), linked temporary mobile group identity (TMGI), quality of service (QoS), or the internet protocol (IP) multicast address for the secondary multimedia broadcast/multimedia service (MBMS) session.

According to one example, the network node may be a group communication server. In another example, the network node may be a multi-cell/multicast coordination entity (MCE).

Another embodiment is directed to an apparatus including at least one processor and at least one memory including computer program code. The at least one memory and the computer program code are configured, with the at least one processor, to cause the apparatus at least to receive a secondary session request comprising multimedia broadcast/multimedia service (MBMS) session attributes, to update the multimedia broadcast/multimedia service (MBMS) bearer context, and to join the internet protocol (IP) multicast and source address for the secondary multimedia broadcast/multimedia service (MBMS) session.

Another embodiment is directed to an apparatus including means for receiving a secondary session request comprising multimedia broadcast/multimedia service (MBMS) session attributes, means for updating the multimedia broadcast/multimedia service (MBMS) bearer context, and means for joining the internet protocol (IP) multicast and source address for the secondary multimedia broadcast/multimedia service (MBMS) session.

In an embodiment, the apparatus may also include means for notifying one or more user equipment (UE(s)) of the secondary multimedia broadcast/multimedia service (MBMS) session.

According to an embodiment, the method may further include means for broadcasting secondary media via the secondary multimedia broadcast/multimedia service (MBMS) session.

In an embodiment, the multimedia broadcast/multimedia service (MBMS) session attributes may include at least one of a temporary mobile group identity (TMGI), linked temporary mobile group identity (TMGI), quality of service (QoS), or the internet protocol (IP) multicast address for the secondary multimedia broadcast/multimedia service (MBMS) session.

According to one example, the apparatus may be a group communication server. In another example, the apparatus may be a multi-cell/multicast coordination entity (MCE).

Another embodiment may be directed to a computer program product encoding instructions for performing any of the method described herein. For example, one embodiment may include a computer program, embodied on a non-transitory computer readable medium. The computer program may be configured to control a processor to perform any of the methods described herein.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for multimedia broadcast/multimedia service (MBMS) session update, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The evolved packet system (EPS) is the evolution of the general packet radio system (GPRS). EPS provides a new radio interface and new evolved packet core (EPC) network functions for broadband wireless data access.

Figure 1:
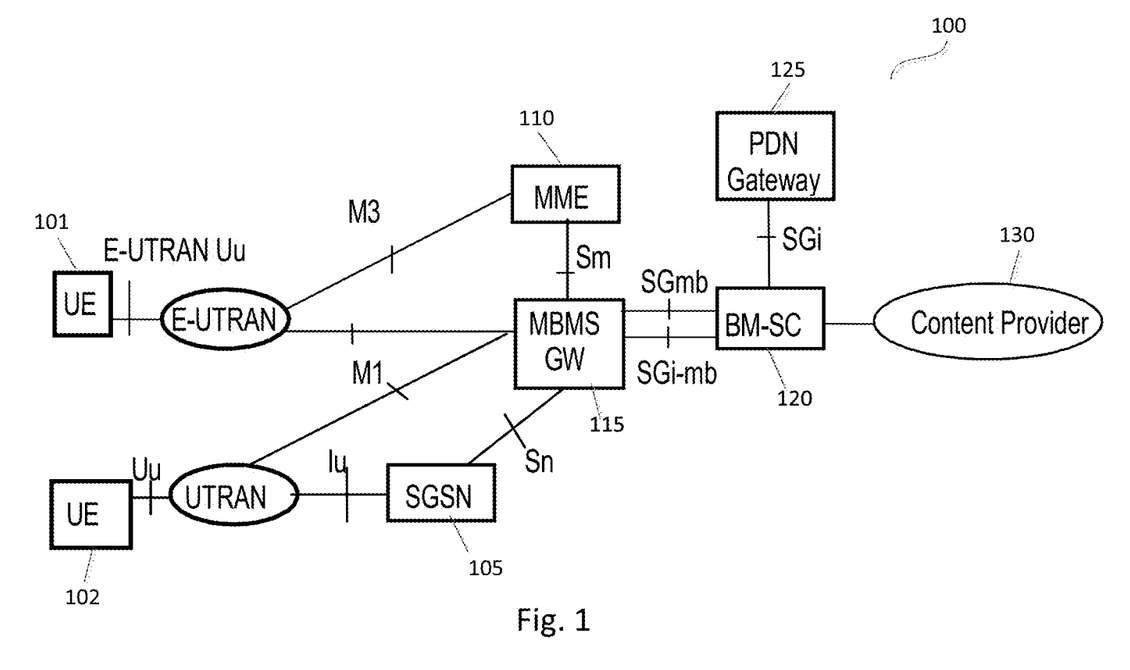
FIG. 1 illustrates an example of a system, according to one embodiment.

Such EPS core network functions include, for example, the Mobility Management Entity (MME), Packet Data Network Gateway (PDN-GW, P-GW), and Serving Gateway (S-GW). A common packet domain Core Network may be used for both Radio Access Networks (RAN): the GERAN and the UTRAN. FIG. 1 illustrates an example architecture for MBMS for LTE. Currently, the architecture supports broadcast services only.

As illustrated in FIG. 1, the core network architecture 100 for EPS (MBMS Broadcast Mode only) may include UE 101 connected to E-UTRAN and UE 102 connected to UTRAN. In this example of the core network architecture 100, UTRAN may be connected to a serving GPRS support node (SGSN) 105 via Iu interface. In addition, E-UTRAN may be in communication with the MME 110 via a M3 interface. In this embodiment, the core network architecture 100 may further include a MBMS gateway (MBMS GW) 115, and a broadcast-multicast service center (BM-SC) 120 in communication with the PDN-GW 125. The BM-SC 120 may also be connected to a content provider 130, such as, but not limited to, a provider of multimedia content.

MME 110 may be considered the main control node for the core network 100. Some features handled by MME 110 may include: bearer activation/de-activation, idle mode UE tracking, choice of S-GW for UE 101, intra-LTE handover involving core network node location, interacting with the home location register (HLR)/home subscriber server (HSS) to authenticate user on attachment, and providing temporary identities for UE 101.

The S-GW, although not illustrated in FIG. 1, is a data plane element within the core network 100. S-GW may manage user plane mobility and act as the main interface between the radio access network(s) and the core network. S-GW can also maintain the data path between eNBs and PDN-GW 125. As a result, S-GW may form an interface for the data packet network at the E-UTRAN. PDN-GW 125 provides connectivity for the UE(s) to external packet data networks (PDNs). A UE 101, 102 may have connectivity with more than one PDN-GW 125 for accessing multiple PDNs.

A serving GPRS support node (SGSN) 105 may be provided in the core network 100 to transfer information to and from the GERAN and UTRAN via an Iu interface, for example. SGSN 105 may communicate with a MBMS GW 115 via, for example, the Sn interface. SGSN 105 may store location information for a UE, such as current cell, and may also store user profiles, such as international mobile subscriber identity (IMSI).

Recent developments in the 3GPP and in the global system for mobile communications association (GSMA) show that operators' demand for deploying MBMS is increasing due to the exponential growth of data traffic caused by mobile phones such as smart phones, and other mobile devices such as tablets, dongles and machine type devices. The need for group communication is also becoming more of a necessity in the context of public safety and is already used in the context of railway systems (i.e., GSM-R). 3GPP recently agreed upon a work item called GCSEL LTE to enable group communication for the public safety market over LTE. This may soon be replicated for LTE-R market when the railway industry decides to adopt LTE as a technology for voice group call service (VGCS)/voice broadcast service (VBS).

Operators are also considering deployment of MBMS for regularly provided services such as video download, software upgrade notification, software download, triggering devices in a group.

3GPP currently supports only broadcast services for MBMS over LTE. 3GPP does not support modification of quality of service (QoS) for broadcast nor multicast services. While this is fine for broadcasting media, such as television shows or sporting events, where the QoS can be predetermined, it is not enough to meet the requirement where the bandwidth of the media can be changed in a dynamic manner or the priority of the session can be upgraded or downgraded.

It is envisioned that GCSE_LTE can be built on top of MBMS, and there is a necessity for a public safety feature that the media may change dynamically from voice to video or vice versa according to SA1 requirements. In addition, the priority may change for the on-going session as well because the sender of the media (talker) can be switched from one person to another. Therefore, there is a need for a mechanism to allow the change of QoS and the addition or reduction of bandwidth due to additional media being broadcasted or removed in a dynamic fashion.

Accordingly, certain embodiments of the invention provide two solution options for how QoS can be updated for on-going MBMS sessions. Certain embodiments also provide a solution to retain the existing session with the existing QoS (e.g., for voice), but add a secondary session on top of the on-going MBMS session with the updated QoS (e.g., for video).

Figure 2:
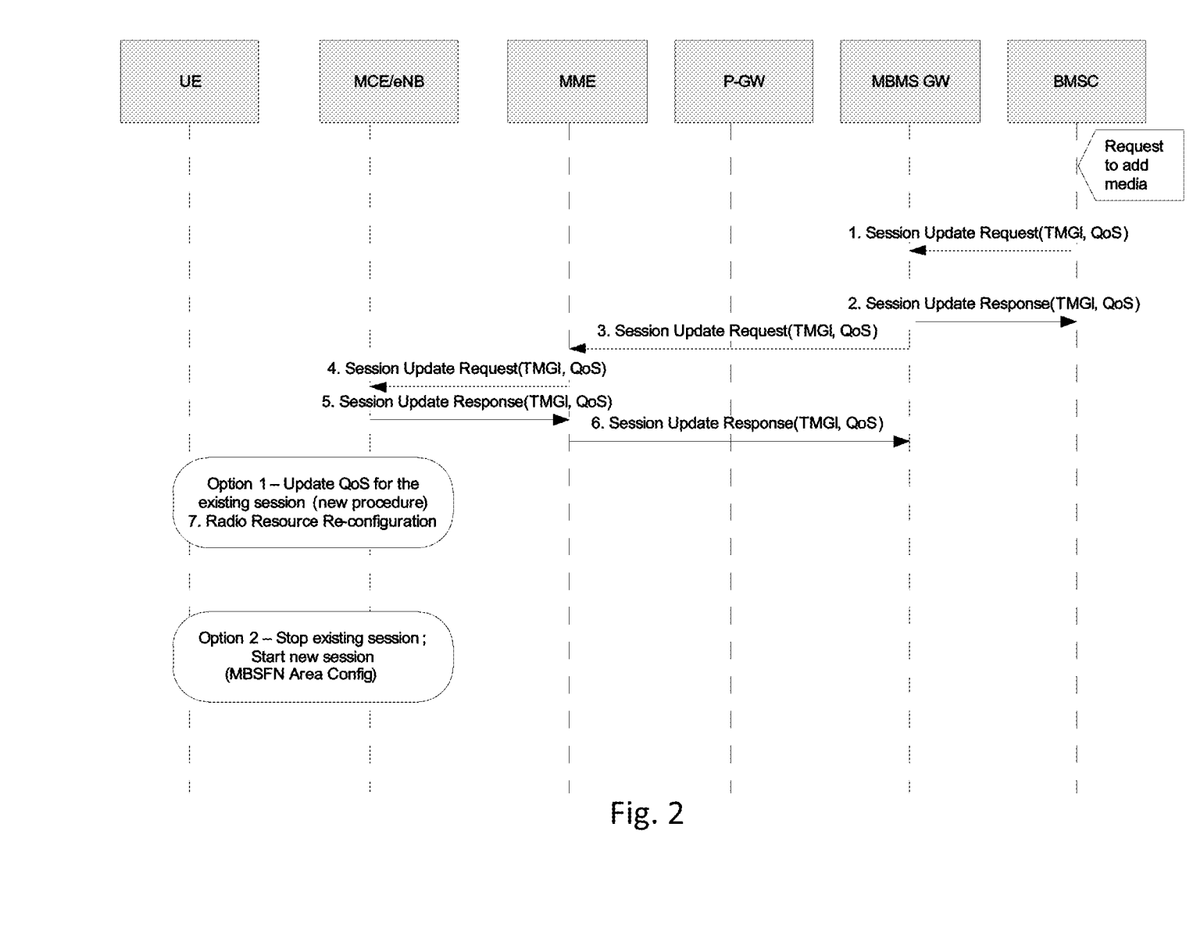
FIG. 2 illustrates an example of a signaling diagram, according to one embodiment.

FIG. 2 illustrates a flow diagram depicting two options for updating an existing MBMS session with new QoS settings, according to certain embodiments. As illustrated in FIG. 2, the BM-SC receives a request from an application server (not shown) for adding media (e.g., video) on the existing MBMS session. Then, at 1, the BM-SC sends a Session Update Request to MBMS GW(s) with the temporary mobile group identity (TMGI) pointing to the current active MBMS session, and with the new QoS which indicates the new requirement such as bandwidth and priority of this new media. The BM-SC may also include the list of serving nodes—MME(s), SGSN(s)—that correspond to the existing session. The MBMS GW stores the new session attributes received from the BM-SC in the MBMS Bearer Context and, at 2, sends a Session Update Response message to the BM-SC.

Continuing with FIG. 2, at 3, the MBMS GW forwards the Session Update Request to the MME/SGSN(s) included in the Session Update Request. In this embodiment, the MME/SGSN is the same as the one(s) that are already involved in the existing MBMS session. The MME/SGSN receives the MBMS Session Update Request message, and, at 4, sends an MBMS Session Update Request message, including the new QoS session attributes, to each eNodeB/MCE/RNC that is connected to the MME/SGSN. In case of E-UTRAN, the MME may send the MBMS Session Update Request to multi-cell/multicast coordination entities (MCE(s)) corresponding to the service area when the MME is connected to multiple MCE(s).

In one embodiment, E-UTRAN/UTRAN update the corresponding MBMS bearer context with the new QoS. In order to modify QoS of an MBMS session, according to an embodiment, E-UTRAN/UTRAN may stop the existing session and start a new session with updated QoS. Alternatively, in another embodiment, if E-UTRAN/UTRAN supports updating QoS for the existing MBMS session, then E-UTRAN/UTRAN can notify the UE, allocate radio resources for modified QoS, and update the on-going MBMS session. Then, at 5, the E-UTRAN/UTRAN responds to the MME/SGSN with a Session Update Response to confirm the reception of the Session Update Request message.

In an embodiment, the MME/SGSN updates the session attributes in its MBMS Bearer Context. The MME/SGSN may return a response to the MBMS GW as soon as the secondary session request is accepted by one E-UTRAN node. The BM-SC starts sending MBMS data with the updated QoS (i.e., with the new media added to the existing media or media with updated QoS such as modified ARP). According to one embodiment, the E-UTRAN/UTRAN can start broadcasting the combined media (existing+new) by notifying the UE via the MBMS notification channel of the new configuration (i.e, radio parameter). According to another embodiment, the E-UTRAN/UTRAN tears down the existing MBMS session and re-creates a new one that accommodates both the existing and new media.

Figure 3:
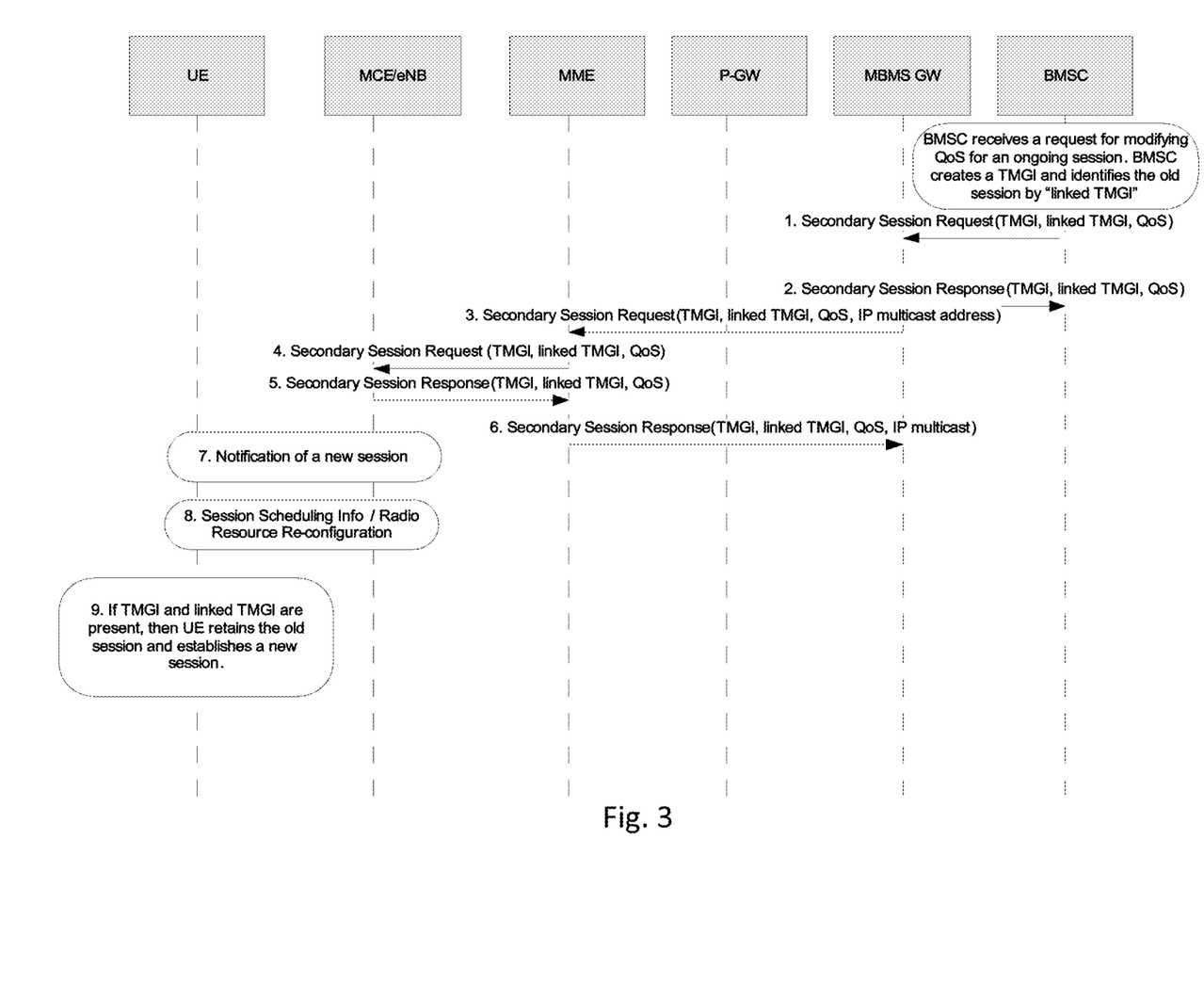
FIG. 3 illustrates an example of a signaling diagram, according to another embodiment.

FIG. 3 illustrates a flow diagram depicting an example of how media can be added as a secondary MBMS session, according to an embodiment. In this example, the secondary MBMS session can be linked to the existing MBMS session. As illustrated in FIG. 2, the BM-SC receives a request, for example, from an application server (not shown) for adding media (e.g., video) on the existing MBMS session. The adding of new media may require the modifying of QoS for an on-going MBMS session. The BM-SC allocates a new TMGI for the new media and also identifies the current active MBMS session with the linked TMGI (indicated as linked TMGI in FIG. 3). The BM-SC sends, at 1, a Secondary Session Request to create a secondary MBMS session with the MBMS GW.

Continuing with FIG. 3, the MBMS GW stores the new session attributes in the MBMS Bearer Context and, at 2, sends a Secondary Session Response message to the BM-SC. At 3, the MBMS GW sends a secondary session request, including the TMGI, linked TMGI, QoS, and IP multicast address for the new secondary MBMS session, to the MME/SGSN(s) that is serving the current active MBMS session. Then, at 4, the MME/SGSN receiving an MBMS Secondary Session Request message, sends an MBMS Secondary Session Request message including the session attributes (TMGI, QoS, linked TMGI, IP Multicast Address for the secondary MBMS session) to each eNodeB/MCE/RNC that is connected to the MME/SGSN for the active MBMS session. In case of E-UTRAN, the MME may send it to MCE(s) corresponding to the service area when MME is connected to multiple MCE(s).

According to this embodiment, E-UTRAN/UTRAN update the MBMS bearer context and joins the IP multicast and source address for the secondary MBMS bearer session. Then, at 5, the E-UTRAN/UTRAN responds the MME/SGSN with a Secondary Session Response to confirm the reception of the Secondary Session Request message. The MME/SGSN updates the session attributes in its MBMS Bearer Context and, at 6, responds to the MBMS GW with a Secondary Session Response. In an embodiment, the MME may return a response to the MBMS GW as soon as the secondary session request is accepted by one E-UTRAN node. The BM-SC then starts broadcasting the MBMS data with the updated QoS, and the MBMS GW multicasts the MBMS data via the given multicast IP address. At 7, the E-UTRAN/UTRAN notifies those UE which are already participating in the current MBMS session with an indication of the secondary MBMS session for the new media. Then, at 8, the E-UTRAN/UTRAN may broadcast the secondary media via the new MBMS radio channel configuration that is given to the UE as stated in step 7 above. If TMGI and linked TMGI are present, then, at 9, the UE retains the old session and establishes a new session. The UE can start to listen to both MBMS broadcast channels to receive the existing and new media.

Certain embodiments include methods for providing a notification to the UE when there is an on-going MBMS session. In an embodiment, the UE should be notified when there is a session update with the codec and the initiation of a new session. When there is an MBMS session on-going, the UE may either be in connected state or in idle state. Embodiments provide several possibilities for notifying the UE with the start of a new session. For example, in one embodiment, the BMSC notifies the UE as part of the on-going traffic (traffic channel)—in band. In another embodiment, the UE monitors the paging channel and the notification happens using paging. According to yet another embodiment, the UE is notified in a MBMS Area configuration update with modified MCCH structure—coupled with MBMS session modification procedure.

Embodiments also provide options for notifying the UE with the codec used for video and/or voice. In one embodiment, during initial UE registration to the server for group communication, the server can indicate the default video and voice codec. If the sender wishes to use other video codec, the server will have to update all the receivers with the new codec information so the receiver knows how to decode the video media. In another embodiment, once the UE is notified of the start of a secondary session, the UE performs SDP negotiations with the application layer (e.g., IMS PoC server) and is provided with the updated media codec.

Figure 4:
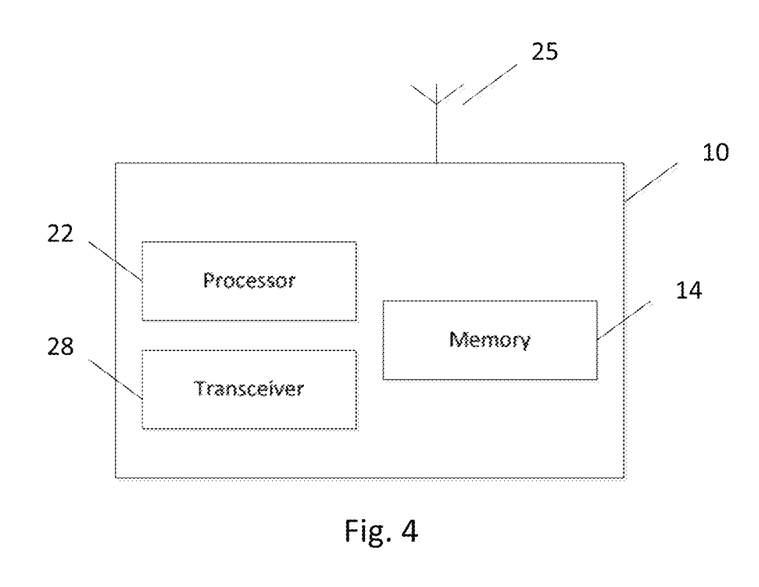
FIG. 4 illustrates an example of an apparatus, according to an embodiment.

FIG. 4 illustrates an example of an apparatus 10 according to an embodiment. In one embodiment, apparatus 10 may be a network node, such as an eNB or MCE. In other embodiments, apparatus 10 may be a BM-SC, MBMS GW, MME/SGSN, or UE as discussed above in connection with FIGS. 2 and 3. It should be noted that one of ordinary skill in the art would understand that apparatus 10 may include components or features not shown in FIG. 4. Only those components or feature necessary for illustration of the invention are depicted in FIG. 4.

As illustrated in FIG. 4, apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a network node, such as an eNB or MCE, for example. In an embodiment, apparatus 10 may be controlled by memory 14 and processor 22 to receive a session update request which may include a TMGI pointing to the current active MBMS session and new QoS requirement. Apparatus 10 may be further controlled by memory 14 and processor 22 to update the MBMS bearer context with the new QoS. In one embodiment, the updating of the MBMS bearer context may include stopping the active MBMS session and starting a new session with the new QoS. In another embodiment, the updating of the MBMS bearer context may include notifying the UE, allocating radio resources for the new QoS, and updating the current active MBMS session.

According to another embodiment, apparatus 10 may be configured to add media as a secondary MBMS session. In one example, the secondary MBMS session is a session that is secondary to a currently active MBMS session. In this embodiment, apparatus 10 may be controlled by memory 14 and processor 22 to receive a secondary session request which may include MBMS session attributes, such as TMGI, linked TMGI, QoS, and/or the IP multicast address for the new secondary MBMS session. Apparatus 10 may be further controlled by memory 14 and processor 22 to update the MBMS bearer context and join the IP multicast and source address for the secondary MBMS session. Apparatus 10 may then be further controlled by memory 14 and processor 22 to notify the UE(s) of the new secondary MBMS session, and broadcast secondary media via the new secondary MBMS session.

Figure 5:
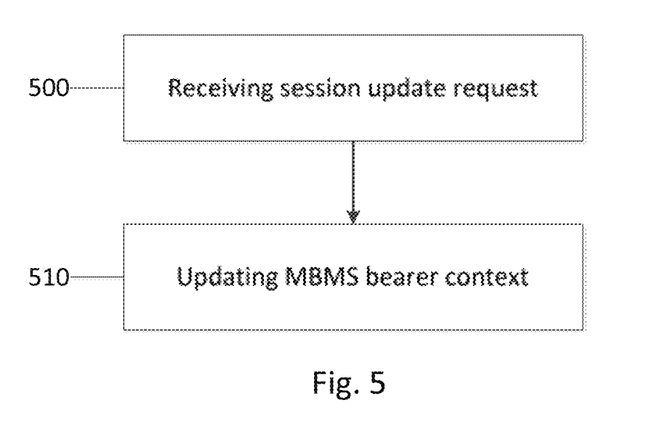
FIG. 5 illustrates a flow diagram of a method, according to one embodiment.

FIG. 5 illustrates an example of a flow diagram of a method for updating QoS for an existing session, according to one embodiment. In an embodiment, the method of FIG. 5 may be performed by a network node, such as an eNB or MCE, for example. The method may include, at 500, receiving a session update request which may include a TMGI pointing to the current active MBMS session and new QoS requirement. The method may then include, at 510, updating the MBMS bearer context with the new QoS. According to one embodiment, the updating of the MBMS bearer context may include stopping the active MBMS session and starting a new session with the new QoS. According to another embodiment, the updating of the MBMS bearer context may include notifying the UE, allocating radio resources for the new QoS, and updating the current active MBMS session.

Figure 6:
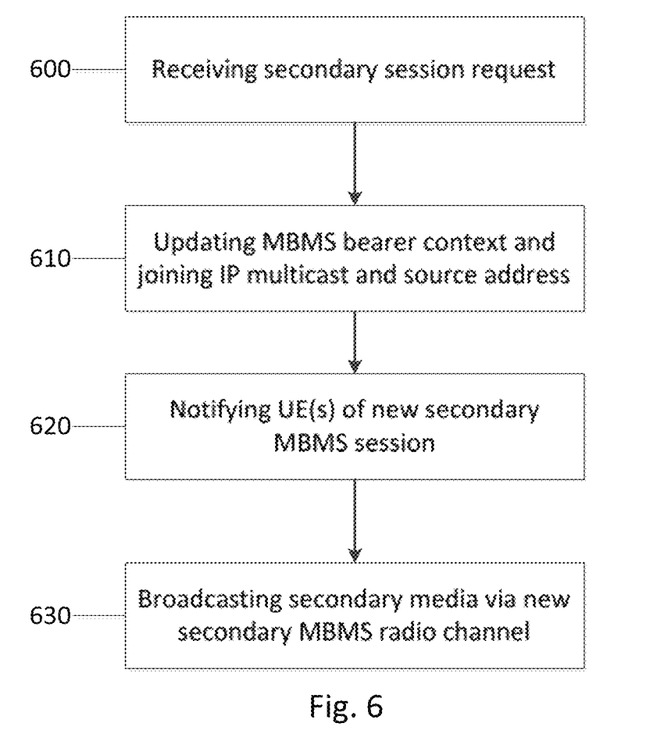
FIG. 6 illustrates a flow diagram of a method, according to another embodiment.

FIG. 6 illustrates an example of a flow diagram of a method for adding media as a secondary session, according to one embodiment. In one example, the secondary session is a session that is secondary to a currently active MBMS session. In an embodiment, the method of FIG. 6 may be performed by a network node, such as an eNB or MCE, for example. The method may include, at 600, receiving a secondary session request which may include MBMS session attributes, such as TMGI, linked TMGI, QoS, and/or the IP multicast address for the new secondary MBMS session. The method may further include, at 610, updating the MBMS bearer context and joining the IP multicast and source address for the secondary MBMS session. The method may also include, at 620, notifying the UE(s) of the new secondary MBMS session, and, at 630, broadcasting secondary media via the new secondary MBMS session.

In some embodiments, the functionality of any of the methods described herein, such as those illustrated in FIGS. 5 and 6 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention provide several advantages. For example, some advantages include the providing of solutions for missing functionality for MBMS in 3GPP in order to meet the group communication requirements. In addition, some embodiments are able to maximally re-use existing EPS bearer handling procedures, thereby enabling easier adoption of these procedures when session update or secondary session for LTE becomes a necessity. Embodiments also fulfill the modification of QoS requirement for public safety deployment when there is a change in the media. Further, certain embodiments are beneficial in enabling group communication for the public safety market, GSM-R to LTE-R market (when it becomes reality in future), M2M and for general group based services provided to mobile devices. Embodiments can also be applied for various types of media, such as conversational type communication (e.g., voice, video), streaming (e.g., video), data (e.g., group messaging or data transfer), or any combination thereof.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by a network node, a session update request comprising a temporary mobile group identity (TMGI) pointing to a currently active multimedia broadcast/multimedia service (MBMS) session and a new quality of service (QoS) requirement; and
updating a multimedia broadcast/multimedia service (MBMS) bearer context with the new quality of service (QoS) requirement,
wherein the new quality of service (QoS) requirement comprises at least an indication of a requirement for bandwidth and priority for the multimedia broadcast/multimedia service (MBMS) session,
wherein the updating of the multimedia broadcast/multimedia service (MBMS) bearer context further comprises
allocating radio resources for the new quality of service (QoS) requirement; and
updating the currently active multimedia broadcast/multimedia service (MBMS) session.

2. The method according to claim 1, wherein the updating of the multimedia broadcast/multimedia service (MBMS) bearer context comprises:
stopping the currently active multimedia broadcast/multimedia service (MBMS) session; and
starting a new session with the new quality of service (QoS) requirement.

3. The method according to claim 1, wherein the updating of the multimedia broadcast/multimedia service (MBMS) bearer context further comprises notifying at least one user equipment of the updating.

4. The method according to claim 1, wherein the network node comprises group communication server.

5. The method according to claim 1, wherein the network node comprises a multi-cell/multicast coordination entity (MCE).

6. A computer program, embodied on a non-transitory computer readable medium, the computer program configured to control a processor to perform the method according to claim 1.

7. An apparatus, comprising:
at least one processor; and
at least one memory including computer program code,
wherein the at least one memory and the computer program code are configured, with the at least one processor, to cause the apparatus at least to
receive a session update request comprising a temporary mobile group identity (TMGI) pointing to a currently active multimedia broadcast/multimedia service (MBMS) session and a new quality of service (QoS) requirement; and
update a multimedia broadcast/multimedia service (MBMS) bearer context with the new quality of service (QoS) requirement,
wherein the new quality of service (QoS) requirement comprises at least an indication of a requirement for bandwidth and priority for the multimedia broadcast/multimedia service (MBMS) session,
wherein, when updating the multimedia broadcast/multimedia service (MBMS) bearer context, the at least one memory and the computer program code are further configured, with the at least one processor, to cause the apparatus at least to
allocate radio resources for the new quality of service (QoS) requirement; and
update the currently active multimedia broadcast/multimedia service (MBMS) session.

8. The apparatus according to claim 7, wherein the at least one memory and the computer program code are further configured, with the at least one processor, to cause the apparatus at least to:
stop the active multimedia broadcast/multimedia service (MBMS) session; and
start a new session with the new quality of service (QoS) requirement.

9. The apparatus according to claim 7, wherein the at least one memory and the computer program code are further configured, with the at least one processor, to cause the apparatus at least to notify at least one user equipment of the update of the multimedia broadcast/multimedia service (MBMS) bearer context.

10. The apparatus according to claim 7, wherein the apparatus comprises a group communication server.

11. The apparatus according to claim 7, wherein the apparatus comprises a multi-cell/multicast coordination entity (MCE).

12. A method, comprising:
receiving, by a network node, a secondary session request comprising multimedia broadcast/multimedia service (MBMS) session attributes for a secondary multimedia broadcast/multimedia service (MBMS) session that is secondary to a currently active multimedia broadcast/multimedia service (MBMS) session;
updating a multimedia broadcast/multimedia service (MBMS) bearer context with a new quality of service (QoS) requirement; and
joining an internet protocol (IP) multicast and source address for the secondary multimedia broadcast/multimedia service (MBMS) session,
wherein the new quality of service (QoS) requirement comprises at least an indication of a requirement for bandwidth and priority for the multimedia broadcast/multimedia service (MBMS) session,
wherein the updating of the multimedia broadcast/multimedia service (MBMS) bearer context further comprises
allocating radio resources for the new quality of service (QoS) requirement; and
updating the currently active multimedia broadcast/multimedia service (MBMS) session.

13. The method according to claim 12, further comprising notifying one or more user equipment (UE(s)) of the secondary multimedia broadcast/multimedia service (MBMS) session.

14. The method according to claim 12, further comprising broadcasting secondary media via the secondary multimedia broadcast/multimedia service (MBMS) session.

15. The method according to claim 12, wherein the multimedia broadcast/multimedia service (MBMS) session attributes comprise at least one of a temporary mobile group identity (TMGI), linked temporary mobile group identity (TMGI), quality of service (QoS), or an internet protocol (IP) multicast address for the secondary multimedia broadcast/multimedia service (MBMS) session.

16. The method according to claim 12, wherein the network node comprises a group communication server.

17. The method according to claim 12, wherein the network node comprises a multi-cell/multicast coordination entity (MCE).

18. A computer program, embodied on a non-transitory computer readable medium, the computer program configured to control a processor to perform the method according to claim 12.

19. An apparatus, comprising:
at least one processor; and
at least one memory including computer program code,
wherein the at least one memory and the computer program code are configured, with the at least one processor, to cause the apparatus at least to
receive a secondary session request comprising multimedia broadcast/multimedia service (MBMS) session attributes for a secondary multimedia broadcast/multimedia service (MBMS) session that is secondary to a currently active multimedia broadcast/multimedia service (MBMS) session;
update a multimedia broadcast/multimedia service (MBMS) bearer context with a new quality of service (QoS) requirement; and
join an internet protocol (IP) multicast and source address for the secondary multimedia broadcast/multimedia service (MBMS) session,
wherein the new quality of service (QoS) requirement comprises at least an indication of a requirement for bandwidth and priority for the multimedia broadcast/multimedia service (MBMS) session,
wherein, when updating the multimedia broadcast/multimedia service (MBMS) bearer context, the at least one memory and the computer program code are further configured, with the at least one processor, to cause the apparatus at least to
allocate radio resources for the new quality of service (QoS) requirement; and
update the currently active multimedia broadcast/multimedia service (MBMS) session.

20. The apparatus according to claim 19, wherein the at least one memory and the computer program code are further configured, with the at least one processor, to cause the apparatus at least to notify one or more user equipment (UE(s)) of the secondary multimedia broadcast/multimedia service (MBMS) session.

21. The apparatus according to claim 19, further comprising broadcasting secondary media via the secondary multimedia broadcast/multimedia service (MBMS) session.

22. The apparatus according to claim 19, wherein the multimedia broadcast/multimedia service (MBMS) session attributes comprise at least one of a temporary mobile group identity (TMGI), linked temporary mobile group identity (TMGI), quality of service (QoS), or an internet protocol (IP) multicast address for the secondary multimedia broadcast/multimedia service (MBMS) session.

23. The apparatus according to claim 19, wherein the network node comprises at least one of a group communication server or a multi-cell/multicast coordination entity (MCE).

\* \* \* \* \*